Aug. 14, 1945.  L. S. SHELDRICK ET AL  2,382,110
TURRET CONTROL
Filed Aug. 11, 1943  2 Sheets-Sheet 1

L. S. Sheldrick
E. J. Farkas
E. Nador
INVENTORS

Aug. 14, 1945.   L. S. SHELDRICK ET AL   2,382,110
TURRET CONTROL
Filed Aug. 11, 1943   2 Sheets-Sheet 2

L. S. Sheldrick
E. J. Farkas
E. Nador
INVENTORS

Patented Aug. 14, 1945

2,382,110

UNITED STATES PATENT OFFICE 2,382,110

TURRET CONTROL

Laurence S. Sheldrick, Dearborn, and Eugene J. Farkas and Emory Nador, Detroit, Mich., assignors to Ford Motor Company, Dearborn, Mich., a corporation of Delaware Application August 11, 1943, Serial No. 498,152

3 Claims. (Cl. 74—280)

This invention relates to a driving device; and, more particularly, a differential speed control particularly adapted to the operation of gun turrets as employed on tanks and in other ordnance and naval armament.

While the control device shown is designed for specific application to tanks and other ordnance vehicles having rotatable turrets, it may be applied as well to other mechanisms in which rapid but precisely controlled orientation is desirable. The principal feature of the present apparatus is that it has two-speed operation by means of which the object to be oriented can be brought quickly to a desired position at coarse feed and thereafter adjusted precisely by the extremely accurate control provided by a fine feed. A further advantage of the present construction is that the operation of the device, which is customarily manual, is localized in one operating mechanism so that either the coarse or fine adjustments may be used by the operator without removing his hand from the single operating handle provided. Another advantage of the present construction is that both coarse and fine mechanisms are self-contained and require no greater space than the conventional single-drive operating unit. This is of particular advantage in the constricted quarters which obtain in the interior of ordnance vehicles where all available space must be reserved for the free operation of movable guns and accessibility for serving the fixed pieces in the turret. Yet another advantage of this construction is its intrinsic durability which is of the highest importance when the punishment inflected upon it in use as part of the military vehicle is considered. At the same time, it is extremely flexible in operation, and changes from coarse to fine and fine to coarse operations may be made instantaneously and without perceptible effort on the part of the operator.

An extended discussion of the advantages of such controls as used in military vehicles is not believed essential to an understanding of the present invention. Other expedients have been suggested in the past to accomplish this function since it is apparent that in the laying of large guns contained in such turrets from one target to another, it is desirable to have some mechanism which will transfer the gun approximately to the position desired and then provide a further and finer adjustment to lay the gun precisely on desired target. The present construction accomplishes both of these operations and does them quickly and easily and without unduly distracting the attention of the operator from his other pressing duties.

With these and other objects in view, the invention consists in the arrangement, construction and combination of the various parts of the improved device, as described in the specification, claimed in the claims and illustrated in the accompanying drawings, in which:

Figure 1:
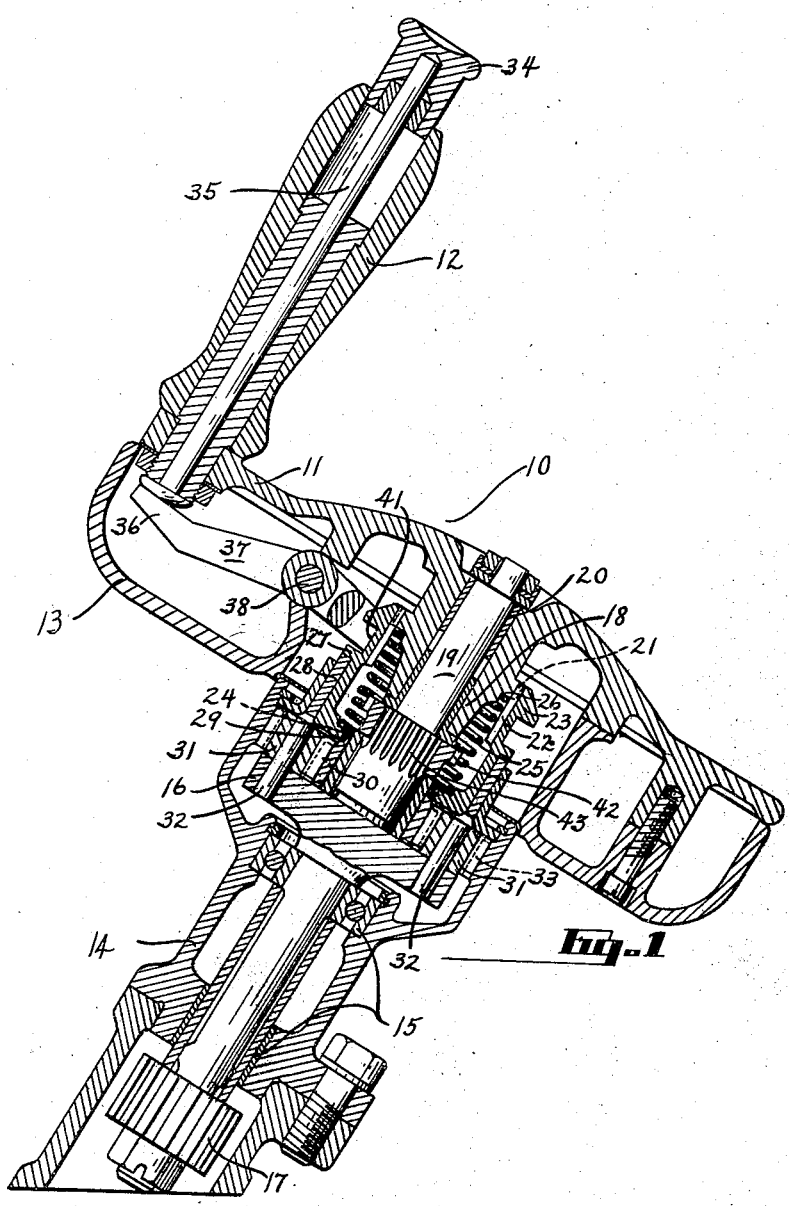
Fig. 1 is a sectional elevation of the device of this invention.

Referring to Fig. 1, the control is shown generally at 10 and comprises a rotatable disc 11 having an actuating handle 12 and a lower casing 13. The disc is rotatably mounted on the shaft 19, which, in turn, is rotatably supported in the fixed housing 14 by means of the bearings 15. The shaft 19 includes an integral, intermediate planetary spider 16 and a gear connection 17 at its lower end for operable engagement with the driving means proper of the turret, the latter elements not being shown. Formed integrally with the disc 11 and extending inwardly therefrom is a sleeve 18 (mounted on the shaft 19 through an interposed bearing 20) having an externally splined member 21 formed thereon. The externally splined member 21 is constantly in mesh with a corresponding internally splined member 22 on the shiftable sleeve 23 which has a second internally splined member 24 at its lower extremity. The shiftable sleeve 23 is normally urged downwardly by the spring 25 which engages it and a shoulder 26 on the sleeve 18 and occupies the position shown in Fig. 1 in which its further downward movement is restrained by the shoulder 27 and the bearing 28. In this position, the externally splined member 21 engages the internally splined member 22, and the second internally splined member 24 engages a corresponding externally splined member 29, which is formed integrally with the sun gear 30 of a planetary gearing system, the sun gear being normally free to rotate about the shaft 19. Engaging the sun gear 30 are the planet gears 31 rotatably mounted on the stub shafts 32 on the planetary spider 16, and these, in turn, engage the ring gear 33 which is formed as a part of the housing 14.

In the position shown in Fig. 1, revolution of the handle 12 rotates the disc 11 and the sleeve 18, which, through the gearing train described, imparts rotation to the sun gear 30 of the planetary system. The operation of the planetary system between the sun gear 30 and the ring gear 33 imparts rotation to the spider 16 and the associated shaft 19 at a reduced rate of speed; and, accordingly, permits an extremely close adjustment as between the position of the handle 12 and the motion imparted through the gear connection 17 to the turret drive itself. This is useful in obtaining a very precise azimuth of the turret; but, of course, does not permit its rapid traverse due to the increased number of turns which must be given the disc 11 to obtain a similar rotation of the geared connection 17.

Figure 2:
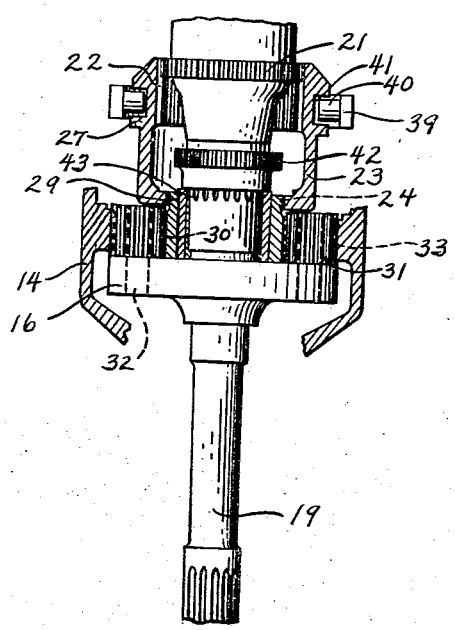
Figs. 2 and 3 are partial sectional elevations of the device on a smaller scale, in the first the coarse speed train and in the second the fine speed train being engaged.
Figure 3:
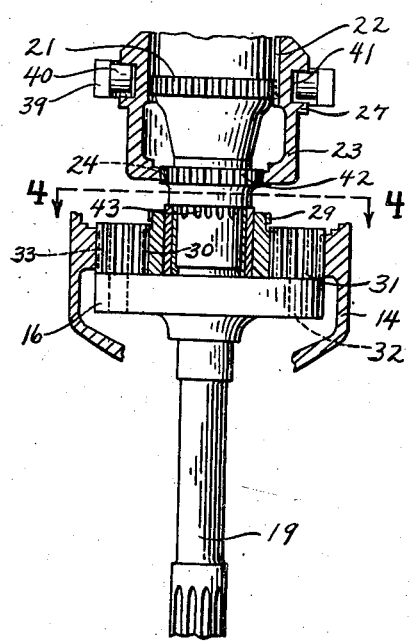
Figure 4:
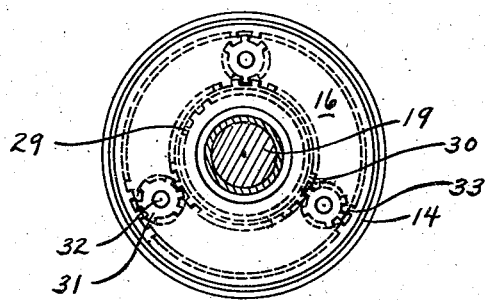
Fig. 4 is a sectional view, taken on the line 4—4 of Fig. 3.

Rapid traverse of the device is obtained by an alternative gear train which is selectively controlled by the operator through a push button 34 mounted on the handle 12. Manipulation of this push button, which is mounted on a slidable shaft 35, depresses the outer end 36 of the lever 37 pivoted at 38 on the casing 13 and having an inner forked end 39 with pin followers 40 (see Figs. 2 and 3) which are engaged in a channel 41 formed on the exterior of the shiftable sleeve 23. Accordingly, depression of the push button 34 lifts the shiftable sleeve 23 against the pressure of the spring 25 from the position shown in Fig. 1 so that while the internally splined member 22 remains in mesh with the externally splined member 21 on the sleeve 18, the second internally splined member 24 is disengaged from the externally splined member 29 associated with the sun gear 30 and engages an externally splined member 42 which is splined to the shaft 19 at 43, as best shown in Fig. 3. Revolution of the handle 12, under these conditions, occasions rotation of the shiftable sleeve 23 (since it is engaged at all times with the external gear 21) which through members 24 and 42, causes direct rotation of the shaft 19 at the same speed as the handle. Since the shiftable sleeve 23 is disengaged from the sun gear 30, the latter is free to rotate with respect to the shaft 19, and, consequently, rotation of the spider 16 occasions only free rotation of the planet gears 31 through the latter's engagement with the ring gear 33. In this position, it is apparent that a direct drive between the handle 12 and the geared connection 17 is established and when so operated, the turret may be given such rapid traverse as may be required under the circumstances.

The tactical advantage of the present device lies in the fact that both rapid and slow traverse are available to the operator of the turret through a single control; namely, that of the handle 12. It thus follows that he may, by suitable operation of the push button 34, change from slow to fast traverse and back at will and at any time when this may be desirable in the operation of the turret. This contrasts with former controls in which a multiplicity of separated levers, handles or buttons was required and which necessarily distracted the operator's attention from the other duties which should occupy him at such time. In this connection, extreme flexibility of the present control is noteworthy. The shifting from rapid to slow traverse and back again may be accomplished as many times and at as short intervals as may be desirable through one-handed manipulation of the handle 12 and its associated push button 34 alone. The benefit of this construction from a military standpoint is immeasurable.

Apart from these considerations, other advantages which flow from the construction used are the extreme compactness of the device as compared with former constructions; its dependability, which is highly important when the vehicle is in action; and the positive control exercised at all times over relative traverse speeds. Space is always at a premium on the interior of military vehicles, and the present control incorporates a volume no more than that required for a conventional single-speed control but has all of the mechanism required to obtain a two speed control. The construction employed being centered around the driving shaft (which is mounted in the fixed housing) and the lower casing (which is also supported on the permanent housing) gives very little opportunity for derangement through service or accident. The control obtained is positive; the use of friction clutches or other mechanisms of similar nature is avoided; and direct gear drive is obtained in either position of operation. Furthermore, the device is normally set for a slow-speed traverse so that in the event of minor damage to the turret, the maximum mechanical advantage may be applied to move it. Moreover, in a great number of cases the azimuth control of the turret is preferably obtained within the slow-traverse range.

Some changes may be made in the arrangement, construction and combination of the various parts of the improved device without departing from the spirit of the invention and it is the intention to cover by the claims such changes as may be reasonably included within the scope thereof.

The invention claimed is:

1. In a speed control device, a fixed housing, a member rotatably mounted on said housing and axially fixed with respect thereto, a handle eccentrically mounted on said member, a shaft centrally located with respect to said member and rotatably mounted in said housing, a planetary gear spider fixed to rotate with said shaft, a fixed ring gear on said housing and a sun gear rotatably mounted on said shaft meshing with planet gears carried by said spider, clutch means associated with said member and with said sun gear and said shaft and selectively operable to interengage said member and said shaft or said member and said sun gear to provide various gear ratios effective between said member and said shaft to vary the relative speeds thereof, said selectively operable clutch means including an axially slidable sleeve supported by said fixed housing.

2. In a speed control device, a fixed housing, a disc rotatably mounted on said housing, a handle located adjacent the periphery of said disc, a shaft centrally located with respect to said disc, a planetary gear spider fixed to rotate with said shaft, a fixed ring gear on said housing and a rotatable sun gear meshing with planet gears carried by said spider, clutch means associated with said disc and with said sun gear and said shaft and selectively operable to interengage said disc and said shaft or said disc and said sun gear to provide various gear ratios effective between said disc and said shaft to vary the relative speeds thereof, said selectively operable clutch means including an axially slidable sleeve having an external channel thereon, a lever pivoted on said disc and having a forked end engaging said channel, a push-button control on said handle engaging the other end of said lever, and a spring means normally urging said selectively operable gear means into one position of engagement.

3. In a speed control device, a fixed housing, an operating member rotatably mounted on said housing and axially fixed with respect thereto, a driven shaft rotatably supported in said housing and secured against axial movement, a planetary gear spider fixed to rotate with said shaft, a fixed ring gear on said housing and a rotatable sun gear, both meshing with a planet gear carried by said spider, clutch means associated with said operating member and with said sun gear and said shaft and selectively operable to drivingly interengage said operating member and said shaft or said operating member and said sun gear to provide various gear ratios effective between said operating member and said driven shaft to vary the relative speed thereof, said clutch means comprising external splines on said sun gear and said shaft and said operating member, a sleeve axially slidable in said housing and having internal splines thereon, said internal splines engaging the external spline on said operating member under all conditions of operation and selectively engaging the splines on said shaft or said sun gear to vary said gear ratios, and means to reciprocate said sleeve into various positions of engagement.

LAURENCE S. SHELDRICK.
EUGENE J. FARKAS.
EMORY NADOR.